(12) United States Patent
Koeniger

(10) Patent No.: US 12,453,439 B2
(45) Date of Patent: Oct. 28, 2025

(54) KNOCK BOX

(71) Applicant: JK eCom GmbH, Schwebheim (DE)

(72) Inventor: Jan Koeniger, Schwebheim (DE)

(73) Assignee: JK eCom GmbH, Schwebheim (DE)

( * ) Notice: Subject to any disclaimer, the term of this patent is extended or adjusted under 35 U.S.C. 154(b) by 625 days.

(21) Appl. No.: 17/274,822

(22) PCT Filed: Sep. 4, 2019

(86) PCT No.: PCT/EP2019/073586
§ 371 (c)(1),
(2) Date: Mar. 10, 2021

(87) PCT Pub. No.: WO2020/053046
PCT Pub. Date: Mar. 19, 2020

(65) Prior Publication Data
US 2022/0047113 A1    Feb. 17, 2022

(30) Foreign Application Priority Data

Sep. 10, 2018   (DE) .......................... 202018105164.4

(51) Int. Cl.
*A47J 31/60*    (2006.01)
*A47J 31/36*    (2006.01)

(52) U.S. Cl.
CPC .......... *A47J 31/60* (2013.01); *A47J 31/3671* (2013.01)

(58) Field of Classification Search
CPC ........ A47J 31/60; A47J 31/3671; A47J 31/44; B65F 1/14; B65F 1/12; B65F 1/02; B65D 25/00; A46B 17/00

USPC ................. 220/643, 651, 695–702
See application file for complete search history.

(56) References Cited

U.S. PATENT DOCUMENTS

| 7,784,145 | B1 * | 8/2010 | Prokop | B44D 3/126 |
| | | | | 220/570 |
| 2008/0128457 | A1 * | 6/2008 | Bravo | B65D 23/108 |
| | | | | 222/571 |
| 2009/0173849 | A1 * | 7/2009 | Rose | B44D 3/126 |
| | | | | 248/146 |
| 2010/0077661 | A1 * | 4/2010 | Brandstatter | A01G 27/02 |
| | | | | 47/80 |
| 2019/0133369 | A1 | 5/2019 | Yoo | |

FOREIGN PATENT DOCUMENTS

| AU | 2004100302 A4 | 5/2004 |
| AU | 2016354665 A1 | 5/2017 |
| DE | 200 18 917 U1 | 11/2001 |
| EP | 0 283 341 A1 | 9/1988 |

(Continued)

OTHER PUBLICATIONS

English Machine Translation of FR-2567011-A1 (Year: 1986).*

(Continued)

*Primary Examiner* — Don M Anderson
*Assistant Examiner* — Laura E. Parker
(74) *Attorney, Agent, or Firm* — Westborough IP Group, LLC

(57) ABSTRACT

A knock box for knocking off coffee grounds from a portafilter, the knock box having a base and walls extending away from the base for laterally delimiting the interior space of the knock box. The knock box has an impact surface located in the area of the walls of the knock box.

24 Claims, 6 Drawing Sheets

(56) References Cited

FOREIGN PATENT DOCUMENTS

| | | | | |
|---|---|---|---|---|
| FR | 2 567 011 | | 1/1986 | |
| FR | 2567011 A1 | * | 1/1986 | |
| GB | 2485329 | | 5/2012 | |
| GB | 2485329 A | * | 5/2012 | ............. A47J 31/44 |
| KR | 20-0469897 Y1 | | 11/2013 | |
| KR | 10-1682352 B1 | | 11/2016 | |
| WO | WO 2018/074660 A1 | | 4/2018 | |
| WO | WO-2020000045 A1 | * | 1/2020 | .......... A47J 31/0663 |

OTHER PUBLICATIONS

HOMEE Coffee Knock Box, retrieved from https://www.amazon.com/HOMEE-Espresso-Schock-Absorbent-Removable-Non-Slip/dp/B07FHYFP6N, available Jul. 2, 2018 (see p. 6) (Year: 2018).*

Thermoplastic Polyurethane—Wikipedia, retrieved from https://web.archive.org/web/20180817140859/https://en.wikipedia.org/wiki/Thermoplastic_polyurethane, dated Jul. 26, 2018 (see p. 4) (Year: 2018).*

Homeffect Knock Box, retrieved from https://www.amazon.com/homeffect-Knock-Box-Improved-Handling/dp/B07QTCXTK5, available Aug. 7, 2019 (see p. 4) (Year: 2019).*

"Zehn Abschlagboxen im Test", CREMA, vol. 5, No. 2015, Nov. 1, 2015 (Nov. 1, 2015), pp. 58-61, XP055241082.

* cited by examiner

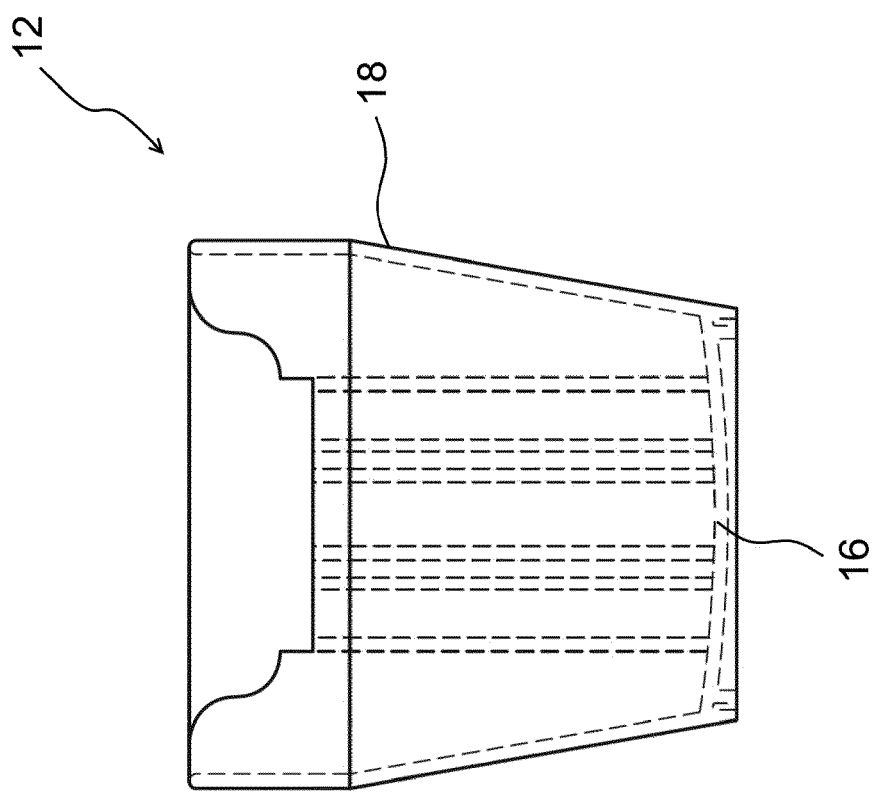
Fig. 1
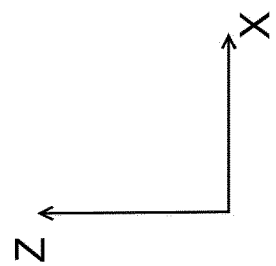

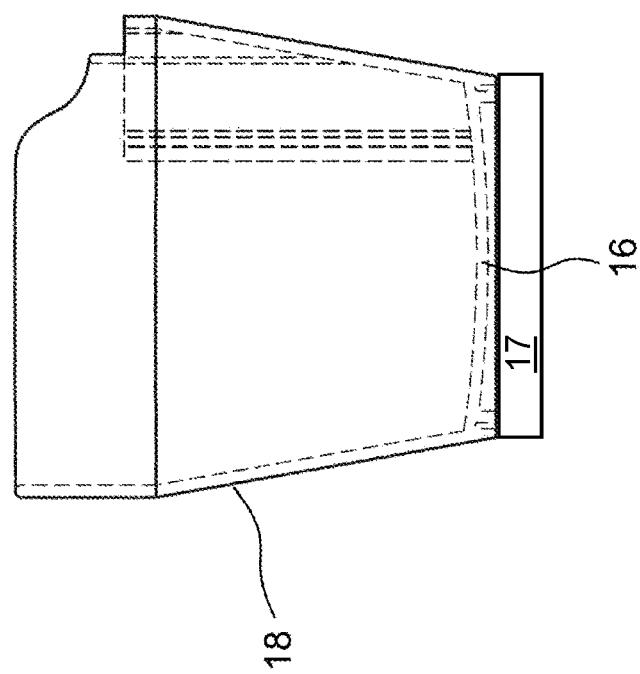
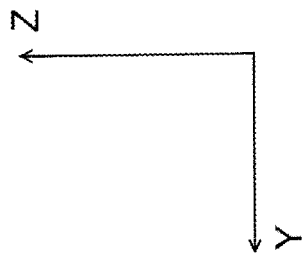
Fig. 2

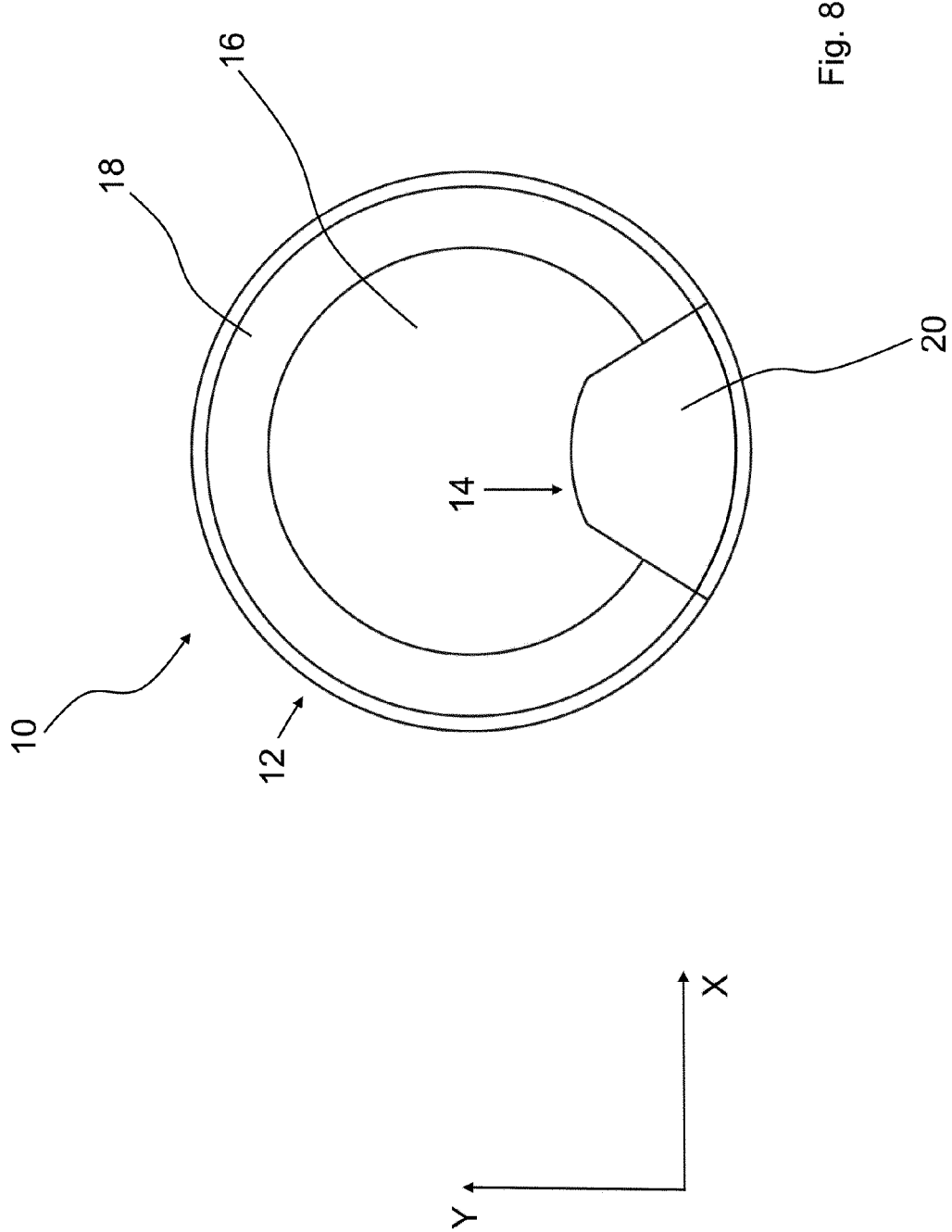

KNOCK BOX

TECHNICAL FIELD

The system described herein relates to a knock box for knocking off coffee grounds from a portafilter.

BACKGROUND OF THE INVENTION

Knock boxes for knocking off coffee grounds from a portafilter are known from the prior art. Such knock boxes are also referred to, for example, as coffee waste bins. They serve to collect the coffee grounds from a portafilter of a coffee machine when the portafilter is knocked against a bar arranged horizontally in the knock box. When the portafilter strikes against the bar, the coffee grounds, on account of their mass inertia, are slung out of the portafilter and collected by the knock box, while the portafilter rebounds from the bar.

The knock boxes which are known from the prior art have the disadvantage that the bar, which is arranged horizontally in the knock box, is soiled with coffee grounds when the coffee grounds are being knocked off and when the knock box is being emptied out. As a result, the knock boxes which are known from the prior art are laborious to empty out and to clean.

It therefore may be desirable to present a knock box that is easier to clean and to empty than those from the prior art.

SUMMARY OF THE INVENTION

The system described herein may include a knock box that has a base and a wall that extends away from the base and is intended for delimiting the interior of the knock box laterally. The knock box may have an impact surface that is arranged in the region of the wall of the knock box.

Arranging the impact surface in the region of the wall of the knock box may result in there being no problematic elements in the region of the "trajectory" of the coffee grounds when the coffee grounds are being knocked off. There also may be no need for the knock box to contain any elements that span significant regions of the opening of the knock box when the knock box is being emptied out, where such elements would prevent the knock box from being emptied out.

The knock box may have no horizontally arranged bar in embodiments in which the impact surface is arranged in the region of the wall, as such arrangement renders such a bar superfluous.

The impact surface may be oriented at least essentially horizontally. On the one hand, a horizontally oriented impact surface may have the advantage that it allows convenient guidance of the movement when the coffee grounds are being knocked off from the portafilter. Furthermore, an at least essentially horizontal orientation of the impact surface may be advantageous since an impact surface oriented in this way may be suitable for being struck by the portafilter in a downward movement. The portafilter striking against the impact surface in a downward movement may cause the coffee grounds to leave the portafilter in a likewise downwardly directed movement. As a result, the coffee grounds may be collected reliably by the knock box, and the risk of the coffee grounds missing the knock box, and thus soiling the area surrounding the same, may be minimized.

An at least essentially horizontally oriented impact surface should be understood here to mean, in particular, an impact surface which, although not oriented precisely horizontally, is still nonetheless suitable for the portafilter to strike the impact surface in a downwardly directed movement.

In the context of the present application, the terms "horizontal(ly)" and "vertical(ly)" and also all the direction-related information derived from these terms, such as "downward(ly)", should be understood such that they relate to the knock box set down on a horizontal surface with its base oriented downward.

In some embodiments, beneath the impact surface, the knock box may have a supporting region that projects from the wall in the direction of the interior of the knock box.

Such a supporting region may have the advantage that it can support the impact surface when subjected to the impact of the portafilter. This may ensure a stable design that allows coffee grounds to be knocked off even when subjected to high-level impact and heavy portafilters.

The supporting region here advantageously may extend to the base of the knock box. This may allow the impulse of the impact to be continued to the base of the knock box. Furthermore, undercuts thus may be avoided, which may be advantageous both in respect of cleaning and in respect of manufacturing the knock box.

The supporting region may be configured in the form of a hollow profile. Such a configuration of the supporting region may make it possible for the supporting region to be lightweight and nevertheless stable. In some embodiments, the hollow profile may be closed in the direction of the interior of the knock box. Such a configuration may have the advantage that the closed formation of the hollow profile results in no contours that are difficult to clean forming in the direction of the interior.

The impact surface may be arranged on an impact element, which may be accommodated on a main body of the knock box. The impact element may be manufactured here, in particular, in the form of a separate component. This may have the advantage that the impact element may be manufactured from a material that is different from the material of the main body, which may allow optimized material selection for the main body and the impact element.

On a side of the impact element that is directed away from the impact surface, the impact element may have a contour that is adapted to the main body of the knock box. The contour here may be adapted in particular to the supporting region of the knock box. A contour adapted in this way may make it possible for the impact element to be fitted precisely onto the main body.

The knock box, in particular the main body, may be in the form of a plastic injection molding. For example, the main body may be manufactured from an ABS base material.

The material of the impact element is may be a material with a Shore A hardness that is lower than that of the main body. The material of the impact element may be, for example, a thermoplastic polyurethane. Such a material may make it possible for the impact element to have a damping effect on the noise when the portafilter strikes against the impact surface.

The wall of the knock box may have a recess arranged above the impact surface. This may have the advantage that, when the portafilter strikes against the impact surface, the portafilter, in particular the handle thereof, may be located in the region of the recess. In this region, there then may be no wall obstructing the knocking-off movement. Outside the region of the impact surface, the wall, in contrast, then may extend vertically beyond the impact surface and thus contribute to the coffee grounds being accommodated reliably by the interior of the knock box.

The knock box may have a slip-resistant and/or impact-damping element arranged beneath the base of the knock box. Such an element may improve the stability of the knock box. The slip-resistant and/or impact-damping element may be of annular configuration. The material of the slip-resistant and/or impact-damping element may be thermoplastic polyurethane. Such a slip-resistant and/or impact-damping element may improve the stability of the knock box. In addition, the element may reduce the transmission of energy, or of the impulse, to the underlying surface of the knock box.

The impact surface may extend horizontally from the wall in the direction of the center of the knock box over at most 80% of the distance from the wall to the center of the knock box. In some embodiments, the impact surface may extend over at most 65% of this distance. In the case of a knock box with an at least essentially circular cross section in the horizontal plane, the distance from the wall to the center, the latter in this case being the center point of the corresponding circle, may run along the radial direction to the center point. The advantage of this configuration may be that the region in the center of the knock box remains free such that the region is available for the coffee grounds, which thus may leave the portafilter without obstruction.

BRIEF DESCRIPTION OF THE DRAWINGS

The system described herein will be explained in more detail schematically hereinbelow with reference to FIGS. 1 to 8, in which:

FIG. 1 shows a side view of a main body of an exemplary knock box, according to an embodiment of the system described herein;

FIG. 2 shows a further side view of the main body from a different direction, according to an embodiment of the system described herein;

FIG. 8 shows a plan view of the knock box, according to an embodiment of the system described herein.

DESCRIPTION OF VARIOUS EMBODIMENTS

Figure 3:
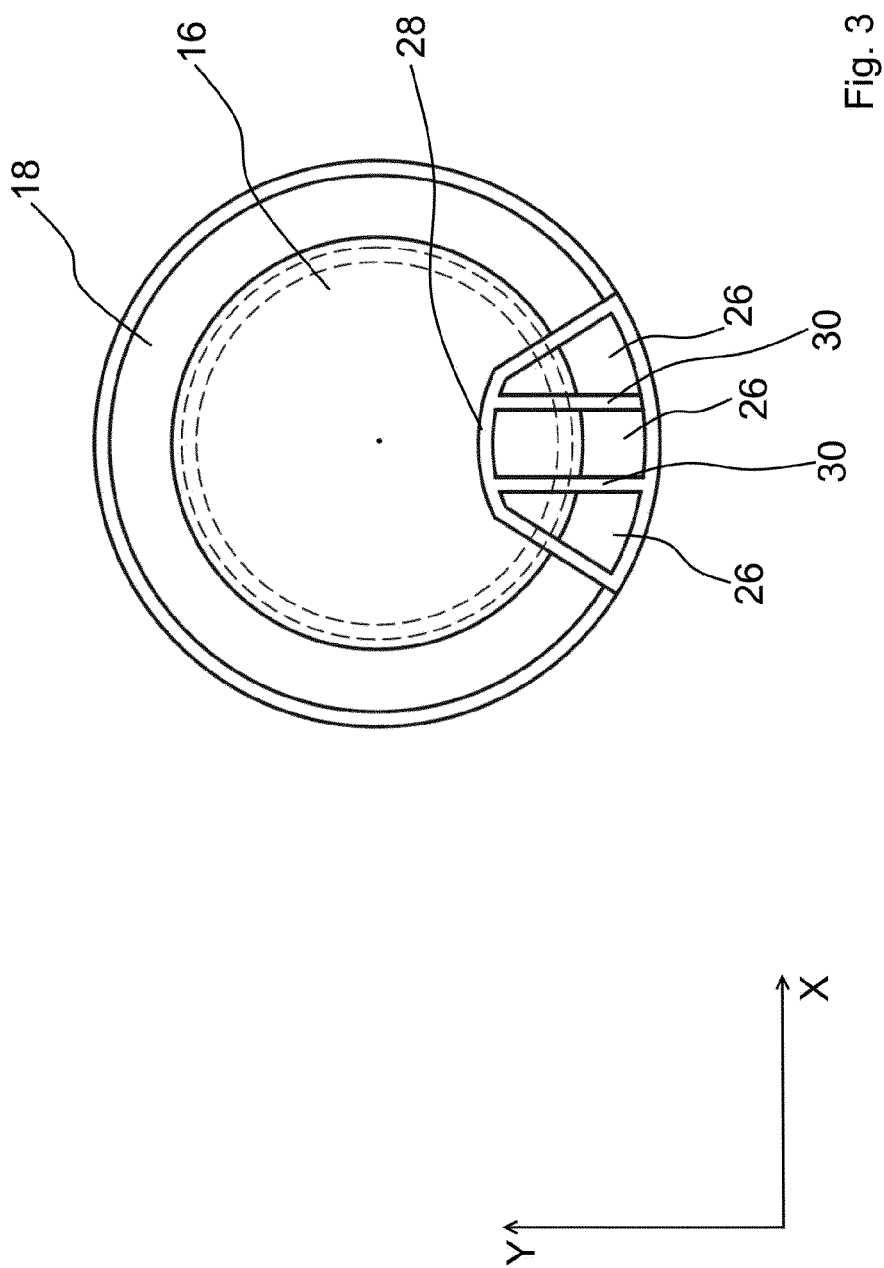
FIG. 3 shows a plan view of the main body, according to an embodiment of the system described herein.

The exemplary knock box 10, as in the example shown, may have a main body 12 and an impact element 14, which may be manufactured in particular in the form of a separate component. An embodiment of the main body 12 is illustrated in FIGS. 1 to 3. In the illustrations, concealed edges are indicated in the form of dashed lines.

The main body may have a base 16 and a wall 18 that extends away from the base 16 and intended for delimiting the interior of the knock box 10 laterally. The knock box 10 may also have a slip-resistant and/or impact-damping element 17, which is shown schematically arranged beneath the base 16 of the knock box 10.

Figure 4:
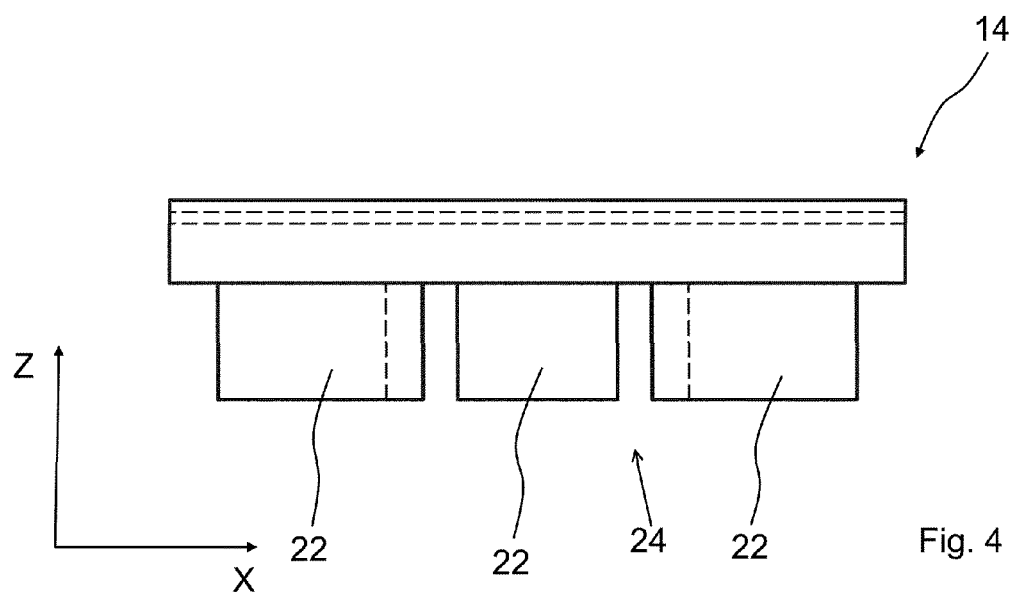
FIG. 4 shows a side view of an impact element of the exemplary knock box, according to an embodiment of the system described herein.
Figure 5:
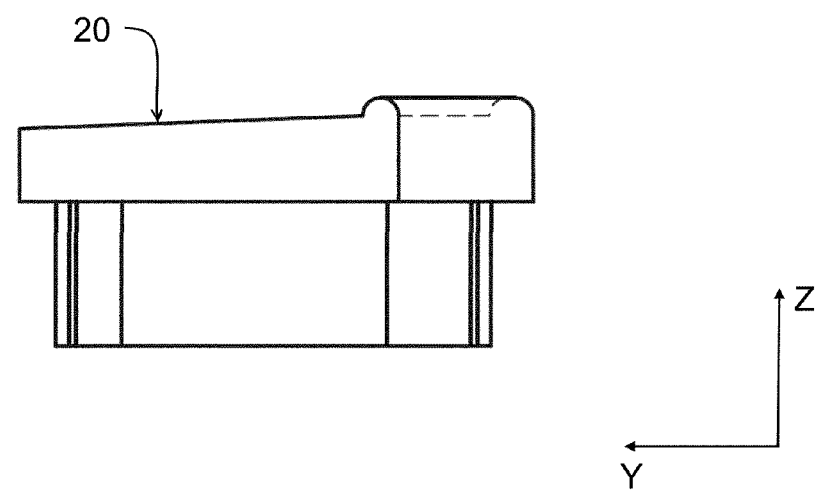
FIG. 5 shows a side view of the impact element from a different direction, according to an embodiment of the system described herein.
Figure 6:
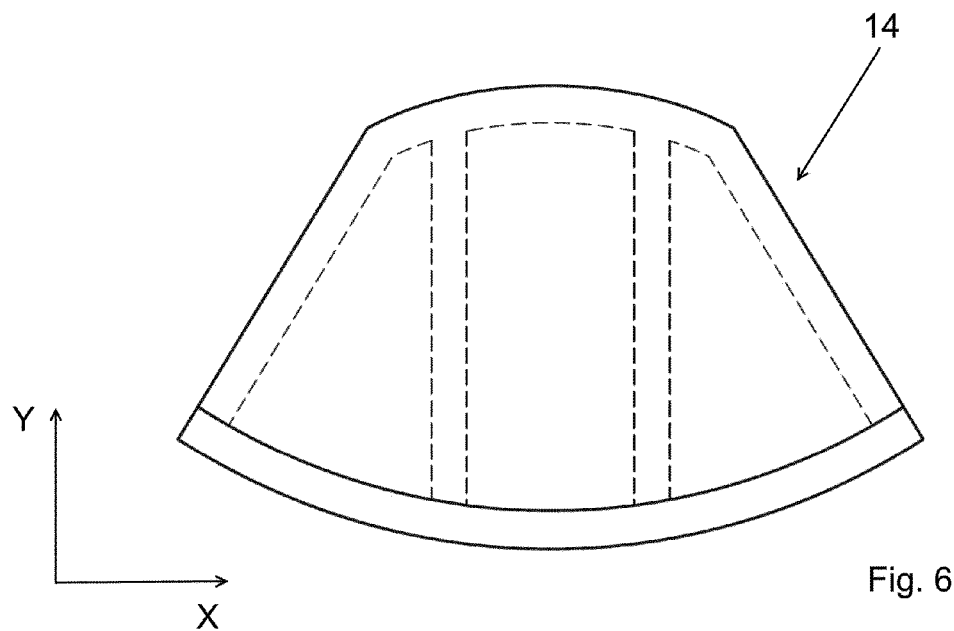
FIG. 6 shows a plan view of the impact element, according to an embodiment of the system described herein.

The impact element 14, an embodiment of which is illustrated in FIGS. 4 to 6, may provide the impact surface 20 of the knock box 10. In the illustrations, concealed edges are indicated in the form of dashed lines.

On a side of the impact element 14 that is directed away from the impact surface 20, the impact element 14 may have a contour 24 that is adapted to the main body 12 of the knock box 10. This contour—as in the example shown—may be realized by one or more protrusions 22.

In the example shown, the protrusions 22 may engage in cavities 26 when the impact element 14 is accommodated on the main body 12.

The main body 12, as in the example shown, may have a supporting region 28 configured in the form of a hollow profile. This supporting region may extend to the base 16. In the example shown, the hollow-profile-like configuration of the supporting region 28, which in the illustrative embodiment shown has, by way of example, two vertical reinforcing crosspieces 30, forms at least one cavity—e.g., three cavities 26—beneath the impact surface 20.

Figure 7:
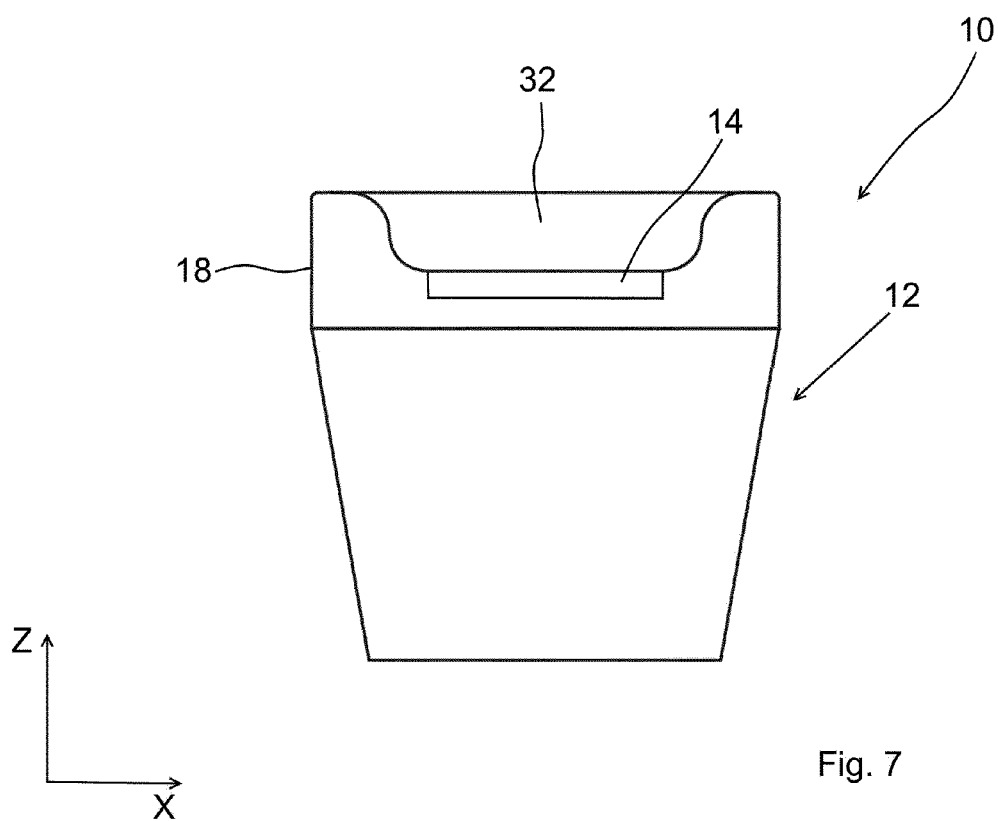
FIG. 7 shows a side view of the knock box, according to an embodiment of the system described herein.

FIGS. 7 and 8 illustrate views of the knock box 10 for embodiments in which the impact element 14 is accommodated on the main body 12. In these two depictions, it is only the visible edges which are illustrated, in the form of lines. It can be seen that the wall 18 may have a recess 32 above the impact surface 20. The recess 32 may make it easier for the portafilter to be knocked against the impact surface 20. As shown in FIG. 7, the recess 32 is formed by a notch in the wall 18.

The features of the system described, in the drawings and in the claims, may be essential, both individually and in any desired combinations, to the implementation of the system described herein in its various embodiments. The invention is not restricted to the embodiments described, and may be varied within the scope of the claims and taking into account the knowledge of a person skilled in the relevant art. Other embodiments of the invention will be apparent to those skilled in the art from a consideration of the specification and/or an attempt to put into practice the system described herein. It is intended that the specification and examples be considered as illustrative only, with the true scope and spirit of the invention being indicated by the following claims.

The invention claimed is:

1. A knock box for knocking off coffee grounds from a portafilter, comprising:
    a base;
    a wall that extends away from the base for delimiting the interior of the knock box laterally;
    an impact surface arranged in the region of the wall of the knock box, wherein the knock box has no horizontally arranged bar; and
    a supporting region that supports the impact surface, the supporting region extending in a substantially perpendicular direction away from and disposed beneath the impact surface and projecting away from the wall in a direction of the interior of the knock box, wherein the supporting region extends to the base of the knock box, wherein the impact surface is arranged on an impact element that is accommodated on a main body of the knock box, wherein the impact element is manufactured in the form of a separate component, and wherein the supporting region is part of the main body.

2. The knock box as claimed in claim 1, wherein the impact surface is oriented essentially horizontally.

3. The knock box as claimed in claim 1, wherein the impact element is manufactured from a material that is different from the material of the main body.

4. The knock box as claimed in claim 1, wherein, on a side of the impact element that is directed away from the impact surface, the impact element has a contour that is adapted to the main body.

5. The knock box as claimed in claim 4, wherein the contour is adapted to the supporting region of the main body of the knock box.

6. The knock box as claimed in claim 1, wherein the main body of the knock box is a plastic injection molding.

7. The knock box as claimed in claim 1, wherein the main body of the knock box is produced from an ABS plastic.

8. The knock box as claimed in claim 1, wherein the impact element is produced from a thermoplastic polyurethane.

9. The knock box as claimed in claim 1, wherein the knock box has a slip-resistant and/or impact-damping element arranged beneath the base of the knock box.

10. The knock box as claimed in claim 1, wherein the impact surface extends horizontally from the wall in a direction of a center of the knock box over at most 80% of a distance from the wall to the center.

11. The knock box as claimed in claim 10, wherein the impact surface extends horizontally from the wall in the direction of the center of the knock box over at most 65% of the distance from the wall to the center.

12. The knock box as claimed in claim 1, wherein the impact surface has a hardness that is lower than a hardness of the main body.

13. A knock box for knocking off coffee grounds from a portafilter, comprising:
   a base;
   a wall that extends away from the base for delimiting the interior of the knock box laterally;
   an impact surface arranged in the region of the wall of the knock box, wherein the knock box has no horizontally arranged bar; and
   a supporting region that supports the impact surface, the supporting region extending in a substantially perpendicular direction away from and disposed beneath the impact surface and projecting away from the wall in a direction of the interior of the knock box, wherein the supporting region is configured in the form of a hollow profile, wherein the impact surface is arranged on an impact element that is accommodated on a main body of the knock box, wherein the impact element is manufactured in the form of a separate component, and wherein the supporting region is part of the main body.

14. The knock box as claimed in claim 13, wherein the impact surface is oriented essentially horizontally.

15. The knock box as claimed in claim 13, wherein the impact element is manufactured from a material that is different from the material of the main body.

16. The knock box as claimed in claim 13, wherein, on a side of the impact element that is directed away from the impact surface, the impact element has a contour that is adapted to the main body.

17. The knock box as claimed in claim 13, wherein the main body of the knock box is a plastic injection molding.

18. The knock box as claimed in claim 13, wherein the main body of the knock box is produced from an ABS plastic.

19. The knock box as claimed in claim 13, wherein the impact element is produced from a thermoplastic polyurethane.

20. The knock box as claimed in claim 13, wherein the impact surface has a hardness that is lower than a hardness of the main body.

21. A knock box for knocking off coffee grounds from a portafilter, comprising:
   a base;
   a wall that extends away from the base for delimiting the interior of the knock box laterally;
   an impact surface arranged in the region of the wall of the knock box, wherein the knock box has no horizontally arranged bar; and
   a supporting region that supports the impact surface, the supporting region extending in a substantially perpendicular direction away from and disposed beneath the impact surface and projecting away from the wall in a direction of the interior of the knock box, wherein the supporting region extends to the base of the knock box, wherein the supporting region is part of the main body, and wherein the wall has a recess formed by a notch in the wall and arranged above the impact surface.

22. The knock box as claimed in claim 21, wherein the impact surface is arranged on an impact element that includes a plurality of protrusions that engage cavities of the knock box.

23. A knock box for knocking off coffee grounds from a portafilter, comprising:
   a base;
   a wall that extends away from the base for delimiting the interior of the knock box laterally;
   an impact surface arranged in the region of the wall of the knock box, wherein the knock box has no horizontally arranged bar; and
   a supporting region that supports the impact surface, the supporting region extending in a substantially perpendicular direction away from and disposed beneath the impact surface and projecting away from the wall in a direction of the interior of the knock box, wherein the supporting region is configured in the form of a hollow profile, wherein the supporting region is part of the main body, and wherein the wall has a recess formed by a notch in the wall and arranged above the impact surface.

24. The knock box as claimed in claim 23, wherein the impact surface is arranged on an impact element that includes a plurality of protrusions that engage cavities of the knock box.

* * * * *